(12) United States Patent
Tseng et al.

(10) Patent No.: US 9,030,421 B2
(45) Date of Patent: May 12, 2015

(54) TOUCHSCREEN CONTROLLER WITH ADJUSTABLE PARAMETERS

(75) Inventors: Ryan Tseng, Coronado, CA (US); Adam A. Mudrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 13/357,568

(22) Filed: Jan. 24, 2012

(65) Prior Publication Data

US 2012/0249449 A1 Oct. 4, 2012

Related U.S. Application Data

(60) Provisional application No. 61/471,012, filed on Apr. 1, 2011.

(51) Int. Cl.
*G06F 3/041* (2006.01)
*H02J 7/02* (2006.01)
*H02J 17/00* (2006.01)
*H04B 5/00* (2006.01)

(52) U.S. Cl.
CPC ............... *G06F 3/0418* (2013.01); *H02J 7/025* (2013.01); *H02J 17/00* (2013.01); *H04B 5/0037* (2013.01)

(58) Field of Classification Search
CPC ... G06F 3/04865; G06F 3/0487; G06F 3/044; G06F 3/04875; G06F 3/045

USPC .................... 345/173–179; 178/18.01–18.04
See application file for complete search history.

(56) References Cited

U.S. PATENT DOCUMENTS

| 7,218,498 | B2 | 5/2007 | Caldwell |
| 7,982,719 | B2 | 7/2011 | Cho et al. |
| 2006/0158152 | A1 | 7/2006 | Taniguchi et al. |
| 2006/0227115 | A1 | 10/2006 | Fry |
| 2008/0309625 | A1 | 12/2008 | Krah et al. |
| 2010/0097078 | A1 | 4/2010 | Philipp et al. |
| 2010/0194335 | A1 | 8/2010 | Kirby et al. |
| 2011/0025265 | A1 | 2/2011 | Mochida et al. |
| 2011/0073384 | A1 | 3/2011 | Osoinach et al. |
| 2011/0127953 | A1 | 6/2011 | Walley et al. |

OTHER PUBLICATIONS

International Search Report and Written Opinion—PCT/US2012/030874—ISA/EPO—Jul. 4, 2012.
Choi, W.P., et al., "Bidirectional communication techniques for wireless battery charging systems & portable consumer electronics", Applied Power Electronics Conference and Exposition (APEC), 2010 Twenty-Fifth Annual IEEE, IEEE, Piscataway, NJ, USA, Feb. 21, 2010, pp. 2251-2257, XP031649750, ISBN: 978-1-42444782-4.

*Primary Examiner* — Kimnhung Nguyen
(74) *Attorney, Agent, or Firm* — Knobbe, Martens, Olson & Bear, LLP

(57) ABSTRACT

Systems, devices, and methods for adjusting characteristics of a touch sensing device in the presence of a wireless power field are disclosed. According to one aspect, the presence of a wireless power field may be detected, and a characteristic of a touch sensing device may be adjusted to reduce interference of the wireless power field with the touch sensing device.

29 Claims, 11 Drawing Sheets

TOUCHSCREEN CONTROLLER WITH ADJUSTABLE PARAMETERS

CROSS REFERENCE TO RELATED APPLICATIONS

This application claims priority benefit under 35 U.S.C. §119(e) to U.S. Provisional Patent Application No. 61/471,012 entitled "TOUCHSCREEN CONTROLLER WITH ADJUSTABLE PARAMETERS" filed on Apr. 1, 2011, the disclosure of which is hereby incorporated by reference in its entirety.

FIELD

The present invention relates generally to wireless power. More specifically, the disclosure is directed to systems, device, and methods for adjusting characteristics of a touch sensing device in the presence of a wireless power field.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

Touch sensing devices (e.g., touchscreens) can be negatively affected by the strong electric and/or magnetic fields that are produced by wireless power systems. The electric and magnetic fields can interact with the elements of the touch sensing device and cause the user to see false touches, degraded sensitivity, or combinations thereof.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

According to one embodiment, a device is disclosed. The device includes a touch sensor, a detector configured to receive information indicative of the presence of a wireless power field, and a controller configured to adjust at least one characteristic of a touch sensor based at least in part on the received information.

According to another embodiment, a method of operating a touch sensor is disclosed. The method includes detecting the presence of a wireless power field, and adjusting a sensing characteristic of the touch sensor based on the detection.

According to another embodiment, a device for operating a touch sensor is disclosed. The device includes means for detecting the presence of a wireless power field, and means for adjusting a sensing characteristic of the touch sensor based on the detection.

According to another embodiment, a computer program product for processing data for a program configured to operate a touch sensor is disclosed. The computer program product includes a non-transitory computer-readable medium having stored thereon code for causing processing circuitry to detect the presence of a wireless power field, and adjust a sensing characteristic of the touch sensor based on the detection.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Like reference numbers and designations in the various drawings indicate like elements.

DETAILED DESCRIPTION

The detailed description set forth below in connection with the appended drawings is intended as a description of embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the embodiments of the invention. It will be apparent to those skilled in the art that the embodiments of the invention may be practiced without these specific details. In some instances, well-known structures and devices are shown in block diagram form in order to avoid obscuring the novelty of the embodiments presented herein.

Wirelessly transferring power may refer to transferring any form of energy associated with electric fields, magnetic fields, electromagnetic fields, or otherwise that is transmitted from a transmitter to a receiver without the use of physical electrical conductors. (e.g., power may be transferred through free space). The power output into a wireless field (e.g., a magnetic field) may be received or captured by a receiving antenna or coil to achieve power transfer.

Figure 1:
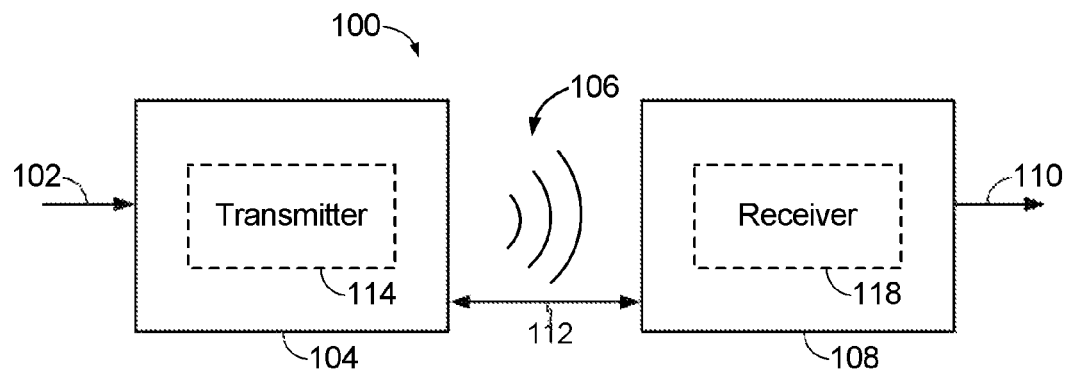
FIG. 1 shows a block diagram of a wireless power transfer system according to some embodiments.

FIG. 1 is a functional block diagram of a wireless power transfer system according to some embodiments. Input power 102 may be provided to a wireless power transmitter 104 for generating a field 106 (e.g., an electromagnetic field) for transferring energy from a wireless power transmitter 104 to a wireless power receiver 108. During wireless power transfer, a wireless power receiver 108 may be coupled to the field 106 and generates an output power 110 for storage or consumption by a device (not shown) coupled to the wireless power receiver 108 for receiving the output power 110. The wireless power transmitter 104 and the wireless power receiver 108 are separated by a distance 112. In one embodiment, the wireless power transmitter 104 and the wireless power receiver 108 are configured according to a mutual resonant relationship. When the resonant frequency of wireless power receiver 108 and the resonant frequency of wireless power transmitter 104 are substantially the same or very close to one another, transmission losses between the wireless power transmitter 104 and the wireless power receiver 108 are minimal when the wireless power receiver 108 is located in the "near-field" of the field 106 generated by the wireless power transmitter 104. As such, wireless power transfer may be provided over larger distance in contrast to purely inductive solutions that may require large coils that require coils to be very close (e.g., in the range of mms). Resonant inductive coupling techniques may thus allow for improved efficiency and power transfer over various distances and with a variety of antenna or coil configurations. The term "coil" is intended to refer to a component that may wirelessly output or receive energy for coupling to another "coil." The coil may also be referred to as an "antenna" of a type that is configured to wirelessly output or receive power. In some embodiments, a coil may also be referred to herein or configured as a "magnetic" antenna or an induction coil.

In one embodiment, The wireless power transmitter 104 may be configured to output a time varying magnetic field with a frequency corresponding to the resonant frequency of the transmit coil 114. When the receiver is within the field 106, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

The wireless power transmitter 104 further includes a wireless power transmit coil 114 for outputting an energy transmission and wireless power receiver 108 further includes a wireless power receive coil 118 for energy reception. As referred to herein, the near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils are sized according to applications and devices to be associated therewith. As described above, an efficient energy transfer occurs by coupling a large portion of the energy in the near-field of the wireless power transmit coil 114 to a wireless power receive coil 118 rather than propagating most of the energy in an electromagnetic wave to the far field. When positioned within the near-field, a coupling mode may be developed between the wireless power transmit coil 114 and the wireless power receive coil 118. The area around the wireless power transmit coil 114 and the wireless power receive 118 where this near-field coupling may occur may be referred to herein as a coupling-mode region.

Figure 2:
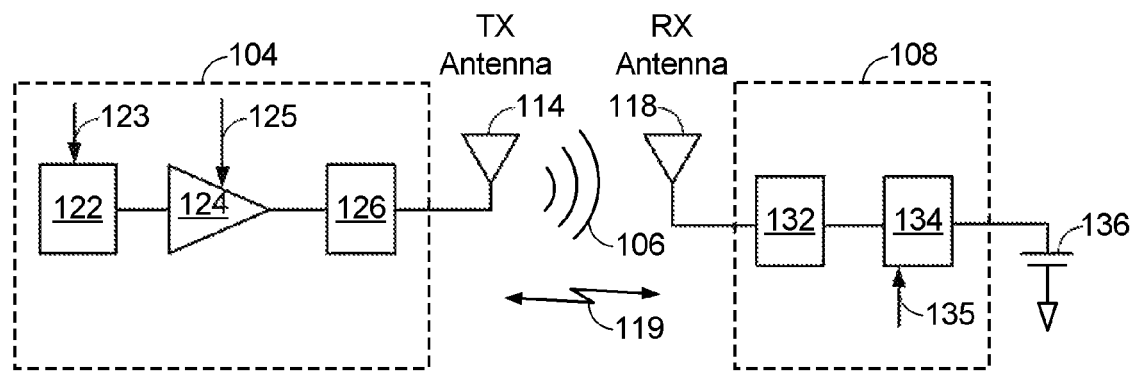
FIG. 2 shows a more detailed block diagram of the wireless power transfer system of FIG. 1.

FIG. 2 shows a more detailed block diagram of the wireless power transfer system of FIG. 1. The wireless power transmitter 104 includes a wireless power signal generator 122 (e.g., a voltage controlled oscillator), a driver 124 (e.g., a power amplifier) and a TX impedance adjustment circuit 126. The wireless power signal generator 122 is configured to generate a signal at a desired frequency, such as 468.75 KHz, 6.78 MHz or 13.56 MHz, which may be adjusted in response to a signal generator control signal 123. The signal generated by the wireless power signal generator 122 may be provided to a driver 124 configured to drive the transmit coil 114 at, for example, a resonant frequency of the transmit coil 114. The driver 124 may be a switching amplifier configured to receive a square wave from the wireless power signal generator 122 (e.g., an oscillator) and output a sine wave. For example, the driver 124 may be a class E amplifier. The signal generated by the wireless power signal generator 122 is received by the driver 124 and may be amplified by the driver 124 with an amplification amount corresponding to an amplification control signal 125. The TX impedance adjustment circuit 126 may be connected to the output of the driver 124, and may be configured to adjust the impedance of the wireless power transmitter 104 based on the impedance of the wireless power transmit coil 114. In some embodiments, the TX impedance adjustment circuit 126 may be configured to match the impedance of components of the wireless power transmitter 104 with the impedance of the wireless power transmit coil 114. While not illustrated, the wireless power transmitter 104 may also include a filter connected to the output of the driver 124 and the input of the TX impedance adjustment circuit 126. The filter may be configured to filter out unwanted harmonics or other unwanted frequencies in the amplified signal.

The wireless power receiver 108 may include an Rx impedance adjustment circuit 132 and a power conversion circuit 134 to generate a DC power output to charge a load 136 as shown in FIG. 2, or power a device coupled to the wireless power receiver 108 (not shown). The Rx impedance adjustment circuit 132 may be included to adjust the impedance of the wireless power receiver 108 based on the impedance of the wireless power receive coil 118. In some embodiments, the Rx impedance adjustment circuit 132 may be configured to match the impedance of components of the wireless power receiver 108 with the impedance of the wireless power receive coil 118. The wireless power receiver 108 and wireless power transmitter 104 may communicate on a separate communication channel 119 (e.g., a Bluetooth channel, a zigbee channel, a cellular channel, or the like).

Wireless power receiver 108, which may initially have an associated load capable of being disabled (e.g., load 136), may be configured to determine whether an amount of power transmitted by the wireless power transmitter 104 and received by the wireless power receiver 108 is appropriate for charging the load 136. Further, the wireless power receiver 108 may be configured to enable a load (e.g., load 136) upon determining that the amount of power is appropriate. In some embodiments, a wireless power receiver 108 may be configured to directly utilize power received from a wireless power transfer field without charging of a load 136 (e.g., a battery). For example, a communication device, such as a near-field communication (NFC) or radio-frequency identification device (RFID may be configured to receive power from a wireless power transfer field and communicate by interacting with the wireless power transfer field and/or utilize the received power to communicate with a wireless power transmitter 104 or other devices.

Figure 3:
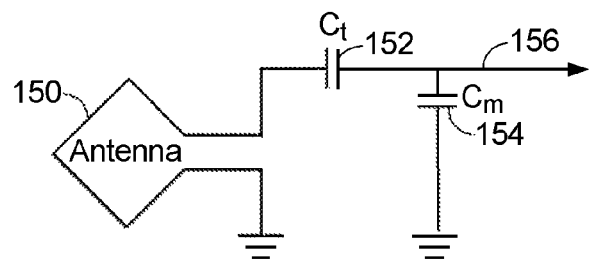
FIG. 3 illustrates a schematic diagram of a loop coil according to some embodiments.

FIG. 3 illustrates a schematic diagram of a loop coil 150 according to some embodiments. As illustrated in FIG. 3, coils used in embodiments may be configured as a "loop" coil 150, which may also be referred to herein as a "magnetic" coil. Loop coils may be configured to include an air core or a physical core such as a ferrite core. Air core loop coils may be more tolerable to extraneous physical devices placed in the vicinity of the core. Furthermore, an air core loop coil may allow placement of other components or circuits (e.g., integrated circuits) within the core area. Further, an air core loop may enable placement of a wireless power receive coil (e.g., wireless power receive coil 118 of FIG. 2) within a plane of a wireless power transmit coil (e.g., wireless power transmit coil 114 of FIG. 2), thereby increasing the coupling factor between the wireless power transmit coil 114 and the wireless power receive coil 118.

Efficient transfer of energy between the wireless power transmitter 104 and wireless power receiver 108 may occur during matched or nearly matched resonance between the wireless power transmitter 104 and the wireless power receiver 108. However, even when resonance between the wireless power transmitter 104 and wireless power receiver 108 are not matched, energy may be transferred, although the efficiency may be affected. As discussed above, energy transfer may occur by coupling energy within the near-field of the wireless power transmit coil 114 to the wireless power receive coil 118 positioned within an area of where the electromagnetic near-field is generated, rather than propagating the energy from the wireless power transmit coil 114 into free space.

The resonant frequency of the loop or magnetic coils is based on the inductance and capacitance of the coils. Inductance in a loop coil is generally the inductance of the loop, whereas, capacitance may generally be included in the form of a capacitive component connected to the loop coil to create a resonant structure (e.g., an LC circuit) having a desired resonant frequency. As a non-limiting example, capacitor 152 and capacitor 154 may be connected to loop coil 150 to create a resonant circuit that generates a signal at a resonant frequency 156. Other components (e.g., variable or fixed inductors, variable or fixed capacitors, and/or variable or fixed resistors) may also be connected to the loop coil 150 for controlling and adjusting the resonant frequency. For larger diameter loop coils 150, the size of capacitance needed to induce resonance may decrease as the diameter or inductance of the loop increases. Furthermore, as the diameter of the loop or magnetic coil increases, the efficient energy transfer area of the near-field may increase. Other resonant circuits are possible. As another non-limiting example, a capacitor may be placed in parallel between the two terminals of the loop coil 150. For a wireless power transmit coil 114, the signal at the resonant frequency 156 may be provided as an input to the loop coil 150.

Figure 4:
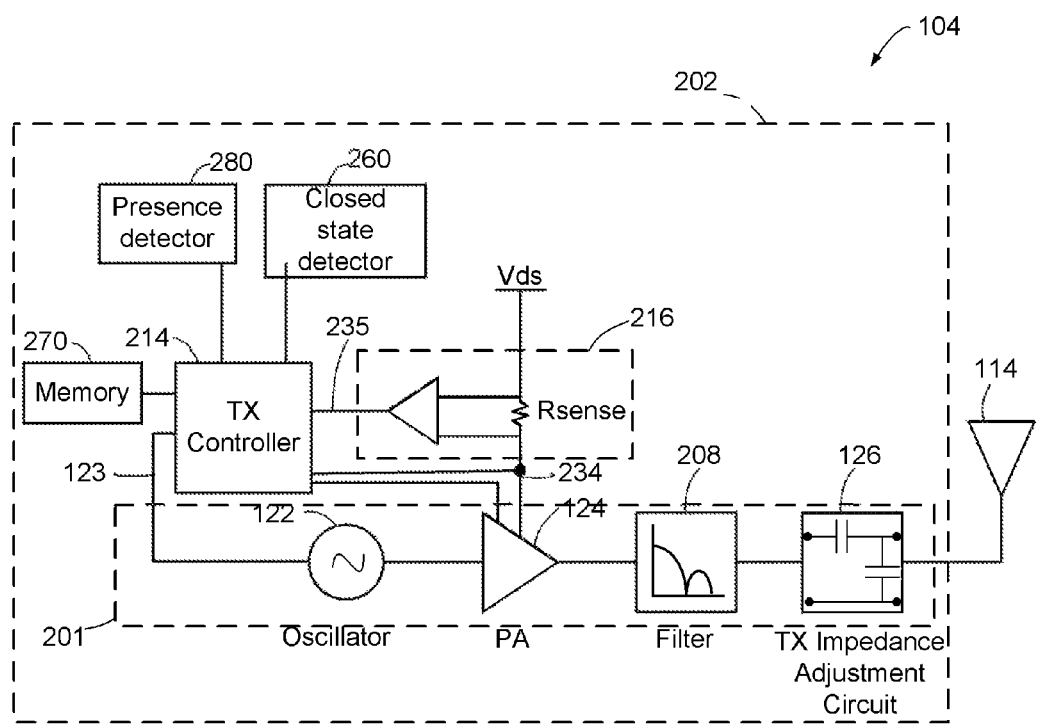
FIG. 4 is a block diagram of a wireless power transmitter according to some embodiments.

FIG. 4 is a block diagram of a wireless power transmitter 104 according to some embodiments. The wireless power transmitter 104 includes transmitter circuitry 202 and a wireless power transmit coil 114. Transmitter circuitry 202 provides RF power to the wireless power transmit coil 114 by providing an oscillating signal to drive the wireless power transmit coil 114. Based on the oscillating signal, the wireless power transmit coil 114 generates an electromagnetic field for transmitting energy from the wireless power transmitter 104. The wireless power transmitter 104 may operate at any suitable frequency. By way of example, wireless power transmitter 104 may operate at the 13.56 MHz ISM band.

Transmitter circuitry 202 includes a TX impedance adjustment circuit 126 configured to adjust the impedance of the transmitter circuitry 202 based on an impedance of the wireless power transmit coil 114 and a low pass filter (LPF) 208 in order to maximize power transmitted by the wireless power transmitter 104. The LPF 208 may be configured to reduce harmonic emissions to levels to prevent self-jamming of devices coupled to wireless power receivers 108. Other embodiments may include different filter topologies, including but not limited to, notch filters that attenuate specific frequencies while passing others and may include an adaptive impedance match, that can be varied based on measurable transmit metrics, such as output power to the coil or DC current drawn by a driver. Transmitter circuitry 202 further includes a driver 124 configured to drive an RF signal as determined by an wireless power signal generator 122. The transmit circuitry 202 may include discrete devices or circuits, and/or may include an integrated circuit. An RF power output from wireless power transmit coil 114 may be within a range of about 2-3 Watts, but is not limited thereto.

Transmitter circuitry 202 further includes a TX controller 214 for enabling the wireless power signal generator 122 during transmit phases (or duty cycles) for specific receivers, for adjusting the frequency or phase of the oscillator, and for adjusting the output power level for implementing a communication protocol for interacting with neighboring devices through their attached receivers. Adjustment of oscillator phase and related circuitry in the transmission path allows for reduction of out of band emissions, especially when transitioning from one frequency to another.

The transmitter circuitry 202 may further include a load sensing circuit 216 for detecting the presence or absence of active receivers and other devices in the vicinity of the charging region 190 generated by wireless power transmit coil 114. By way of example, a load sensing circuit 216 monitors the current flowing to the driver 124 and voltage level of the driver 124 (e.g., as illustrated by current signal 235, and voltage signal 234), which is affected by the presence or absence of active receivers and/or other devices in the vicinity of the charging region generated by wireless power transmit coil 114. Detection of changes to the loading on the driver 124 are monitored by TX controller 214 for use in determining whether to enable the wireless power signal generator 122 for transmitting energy and communicating with an active receiver.

Wireless power transmit coil 114 may be implemented with a Litz wire or as an coil strip with the thickness, width, and metal type selected to keep resistive losses low. The wireless power transmit coil 114 can generally be configured for association with a larger structure such as a table, mat, lamp or other less portable configuration. Accordingly, the wireless power transmit coil 114 generally will not need "turns" in order to be of a practical dimension. An embodiment of a wireless power transmit coil 114 may be "electrically small" (e.g., on the order of a fraction of the wavelength) and tuned to resonate at lower usable frequencies by using capacitors to define the resonant frequency.

The wireless power transmitter 104 may gather and track information about the whereabouts and status of receiver devices that may be associated with the wireless power transmitter 104. Thus, the transmitter circuitry 202 may include a presence detector 280, a closed state detector 260, or a combination thereof, connected to the TX controller 214. The TX controller 214 may adjust an amount of power delivered by the amplifier 210 in response to presence signals from the presence detector 280 and the closed state detector 260. The wireless power transmitter 104 may receive power through a number of power sources, such as, for example, an AC-DC converter (not shown) to convert conventional AC power present in a building, a DC-DC converter (not shown) to convert a conventional DC power source to a voltage suitable for the wireless power transmitter 104, or directly from a conventional DC power source (not shown).

The presence detector 280 may include a motion detector utilized to sense the initial presence of a device to be charged that is inserted into the coverage area of the wireless power transmitter 104. After detection, the wireless power transmitter 104 may be turned on and the RF power received by the device may be used to toggle a switch on the Rx device in a pre-determined manner, which in turn results in changes to the driving point impedance of the wireless power transmitter 104.

The presence detector 280 may also include a detector capable of detecting a human, for example, by infrared detection, motion detection, or other suitable means. In some embodiments, there may be regulations limiting the amount of power that a transmit coil may transmit at a specific frequency. In some cases, these regulations are meant to protect humans, or other biological beings, from electromagnetic radiation. However, there may be environments where transmit coils are placed in areas not occupied by humans, or occupied infrequently by humans, such as, for example, garages, factory floors, shops, and the like. If these environments are free from humans, it may be permissible to increase the power output of the transmit coils above the normal power restrictions regulations. In other words, the TX controller 214 may adjust the power output of the wireless power transmit coil 114 to a regulatory level or lower in response to human presence and adjust the power output of the wireless power transmit coil 114 to a level above the regulatory level when a human is outside a regulatory distance from the electromagnetic field of the wireless power transmit coil 114.

As a non-limiting example, the closed state detector 260 (which may also be referred to herein as an enclosed compartment detector or an enclosed space detector) may be a device such as a sense switch for determining when an enclosure is in a closed or open state. When a wireless power transmitter 104 is included within an enclosure that is in an enclosed state, a power level of the wireless power transmitter 104 may be increased.

In some embodiments, a method by which the wireless power transmitter 104 does not remain on indefinitely may be used. In this case, the wireless power transmitter 104 may be programmed to shut off after a user-determined amount of time. This feature may be used to prevent the wireless power transmitter 104, notably the driver 124, from running long after the wireless devices in its perimeter are fully charged. This event may be due to the failure of the circuit to detect the signal sent from either the repeater or the receive coil that a device is fully charged. To prevent the wireless power transmitter 104 from automatically shutting down if another device is placed in its perimeter, the wireless power transmitter 104 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5A:
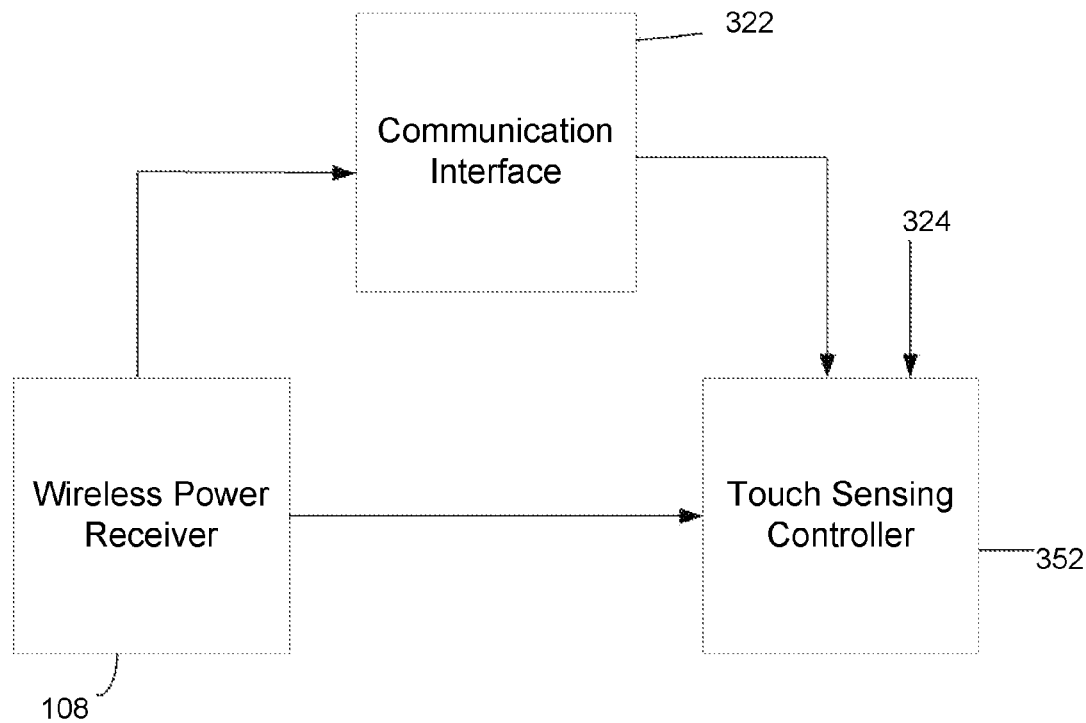
FIG. 5A illustrates an example block diagram of communication paths for detection of the presence of a wireless power field by a touch sensing controller according to some embodiments.

According to some embodiments, a touch sensing device may be configured to detect the presence of a wireless power field, or received information regarding the presence of a wireless power field that is generated by the wireless power transmitter 104. FIG. 5A illustrates an example block diagram of communication paths for detection of the presence of a wireless power field by a touch sensing controller 352 according to some embodiments. As illustrated in FIG. 5A, a touch sensing controller 352 may be configured to receive a signal from a wireless power receiver 108 indicating that the wireless power field is present. The wireless power receiver 108 and the touch sensing controller 352 may be included in the same device (e.g., a device configured to receive power via a wireless field). The touch sensing controller 352 may also receive a wireless power field presence signal from a wireless power receiver 108 through a communication interface 322. For example, a wireless power receiver 108 that is separate from the touch sensing controller 352 may communicate with the touch sensing controller 352 according to a communication protocol through the communication interface 322. Further, the touch sensing controller 352 may be configured to receive a wireless power field presence signal 324 directly from a wireless power transmitter 104, and/or may include a separate detector (not shown) for detecting the presence of a wireless power field. Based on the detection of the wireless power field, the touch sensing controller 352 may be configured to adjust characteristics of a touch sensing device as will be described in greater detail below with reference to FIGS. 8-11. The touch sensing device and the touch sensing controller 352 as described herein may be integrated in various devices, including, for example, an electronic camera, video recorder, a web cam, a cellular telephone, smart phone, portable media player, personal digital assistant, a laptop, a tablet computer, or the like.

Figure 5B:
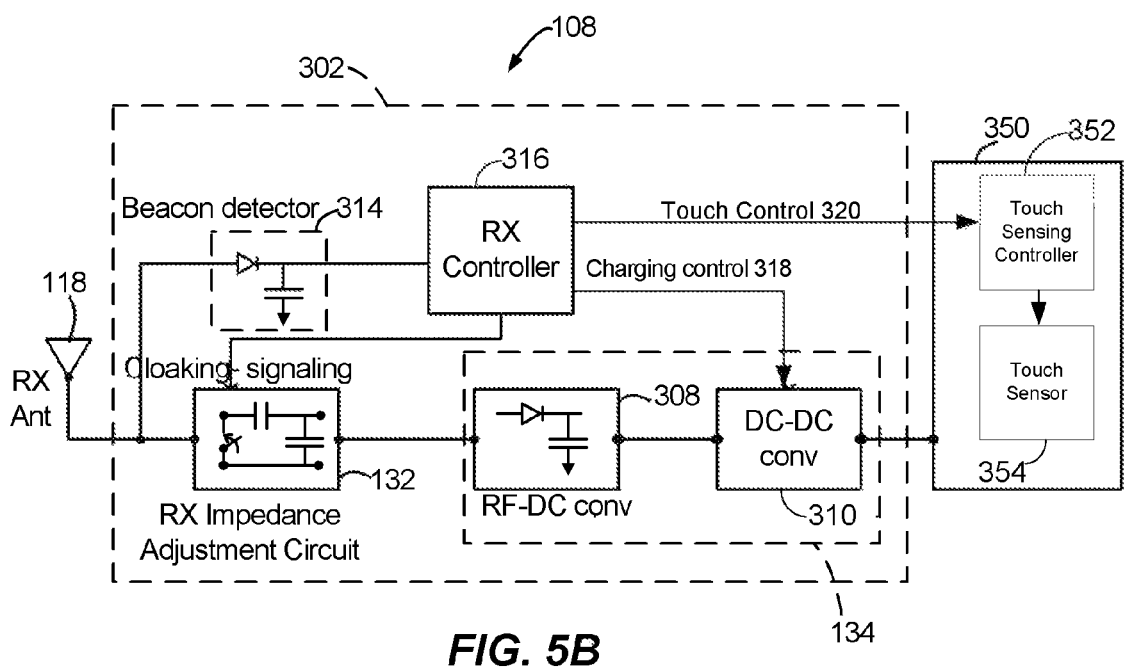
FIG. 5B is a block diagram of a wireless power receiver according to some embodiments.

FIG. 5B is a block diagram of a wireless power receiver 108 and a charging device 352 according to some embodiments. A wireless power receiver 108 may be included in or in communication with a charging device 350, and may be configured to receive power from a charger including a wireless power transmitter (e.g., wireless power transmitter 104) as described above. The wireless power receiver 108 includes receive circuitry 302 and a wireless power receive coil 118. Wireless power receiver 108 may be coupled to the charging device 350 for transferring received power thereto. The wireless power receiver 108 is illustrated as being external to the charging device 350 but may be integrated into charging device 350. Energy may be propagated wirelessly to wireless power receive coil 118 and then coupled through receive circuitry 302 to charging device 350.

Wireless power receive coil 118 may be tuned to resonate at the same frequency, or within a specified range of frequencies, as wireless power transmit coil 114. Wireless power receive coil 118 may be similarly dimensioned with wireless power transmit coil 114 or may be differently sized based upon the dimensions of the associated charging device 350. By way of example, charging device 350 may be a portable electronic device having a diametric or length dimension smaller that the diameter or length of wireless power transmit coil 114. In such an example, wireless power receive coil 118 may be implemented as a multi-turn coil in order to reduce the capacitance value of a tuning capacitor (not shown) and increase the impedance of the wireless power receive coil 118. Wireless power receive coil 118 may be placed around the substantial circumference of charging device 350 in order to maximize the coil diameter and reduce the number of loop turns (e.g., windings) of the wireless power receive coil 118 and the inter-winding capacitance.

The receive circuitry 302 may include Rx impedance adjustment circuit 132 for adjusting an impedance of the components of the receiver circuitry 302 to the wireless power receive coil 118. Receive circuitry 302 may include a power conversion circuit 134 for converting a received RF energy source into charging power for use by the charging device 350. The power conversion circuit 134 may generally be referred to as a voltage regulator for converting the received power from the wireless filed to power for charging the load. In some embodiments, the power conversion circuit 134 includes an RF-to-DC converter 308 and may also in include a DC-to-DC converter 310. The RF-to-DC converter 308 rectifies the RF energy signal received at wireless power receive coil 118 into a non-alternating power, while DC-to-DC converter 310 converts the rectified RF energy signal into an energy potential (e.g., voltage) that is compatible with the charging device 350. Various RF-to-DC converters are contemplated, including partial and full rectifiers, regulators, bridges, doublers, as well as linear and switching converters.

The receive circuitry 302 may further include switching circuitry (not shown) for connecting wireless power receive coil 118 to the power conversion circuit 134 or alternatively for disconnecting the power conversion circuit 134. Disconnecting wireless power receive coil 118 from power conversion circuit 134 not only suspends charging of device 350, but also changes the "load" as "seen" by the wireless power transmitter 104.

As disclosed above, wireless power transmitter 104 includes load sensing circuit 216 which detects fluctuations in the bias current provided to transmitter driver 124, and/or fluctuations in a voltage level of the driver 124. Accordingly, wireless power transmitter 104 has a mechanism for determining when wireless power receivers 108 and/or other devices are present within the charging region 190 of the wireless power transmitter 104.

When multiple wireless power receivers 108 are present in the charging region 190, it may be desirable to time-multiplex the loading and unloading of one or more receivers to enable other receivers to more efficiently couple to the wireless power transmitter 104. A wireless power receiver 108 may also be cloaked in order to eliminate coupling to other nearby receivers or to reduce loading on nearby transmitters. This "unloading" of a wireless power receiver 108 may also be referred to as "cloaking." The switching between unloading and loading controlled by wireless power receiver 108 and detected by wireless power transmitter 104 may provide a communication mechanism from the wireless power receiver 108 to wireless power transmitter 104. Additionally, a protocol can be associated with the switching which enables sending a message from the wireless power receiver 108 to the wireless power transmitter 104. By way of example, a switching speed may be on the order of 100 μsec.

According to some embodiments, communication between the wireless power transmitter 104 and the wireless power receiver 108 refers to a device sensing and charging control mechanism, rather than conventional two-way communication (e.g., in band signaling using the coupling field). In other words, the wireless power transmitter 104 may use on/off keying of the transmitted signal to adjust whether energy is available in the near-field. The wireless power receiver 108 may interpret these changes in energy as a message from the wireless power transmitter 104. From the receiver side, the wireless power receiver 108 may use tuning and de-tuning of the receive coil 118 to adjust how much power is being accepted from the field. In some cases, the tuning and de-tuning may be accomplished via the Rx impedance adjustment circuit 132 and the TX impedance adjustment circuit 126. The wireless power transmitter 104 may detect this difference in power used from the field and interpret these changes as a message from the wireless power receiver 108. It is noted that other forms of modulation of the transmit power and the load behavior may be utilized.

The receive circuitry 302 may further include beacon detector 314 used to identify received energy fluctuations, which may correspond to informational signaling from the wireless power transmitter 104 to the wireless power receiver 108. Furthermore, beacon detector 314 may also be used to detect the transmission of a reduced RF energy signal (e.g., a beacon signal) and to rectify the reduced RF energy signal into a signal having nominal power for awakening either un-powered or power-depleted circuits within receive circuitry 302 in order to control receive circuitry 302 for wireless charging.

The receive circuitry 302 further includes Rx controller 316 for coordinating the processes of wireless power receiver 108 described herein. Cloaking of wireless power receiver 108 by the Rx controller 316 may also occur upon the occurrence of other events including detection of an external wired charging source (e.g., wall/USB power) providing charging power to charging device 350. Rx controller 316, in addition to controlling the cloaking of the wireless power receiver 108, may also monitor beacon detector 314 to determine a beacon state and extract messages sent from the wireless power transmitter 104. Rx controller 316 may also adjust DC-to-DC converter 310 according to a charging control signal 318 to increase the efficiency of the charging system.

The charging device 350 may include the touch sensing controller 352 and a touch sensor 354. The RX controller 316 may communicate with a touch sensing controller 352 through a touch control signal 320. The touch control signal 320 may include a simple "ON/OFF" command in the form of a binary signal (e.g., voltage high, or voltage low). In some embodiments, the touch control signal 320 may include specific information regarding the field frequency and intensity of the wireless power field. The touch sensing controller 352 may respond to the touch control signal 320 by reconfiguring the touch sensor 354 to improve performance of the touch sensor 354 in the presence of the wireless power field. For example, the touch sensing controller 352 may adjust characteristics of the touch sensor 354 and touch sensing controller 352, including drive voltages, detection voltage thresholds, the frequency of operation, software filters, detection process, and post processing method.

Embodiments described herein with reference to signals received by a touch sensing controller 352 may be described based on communication with a wireless power receiver 108. However, the descriptions are applicable to signals received through a communication interface 352, directly from a wireless power transmitter 104, or detected by a detector of the touch sensing controller 324 as discussed above with reference to FIG. 5A. Further, information regarding the wireless power field may be derived through detection of elements of the touch sensor 354 (e.g., based on the effect of the wireless power field on capacitors included for detection of a user's touch) as will be discussed in greater below with reference to FIGS. 6A-6B.

Figure 6A:
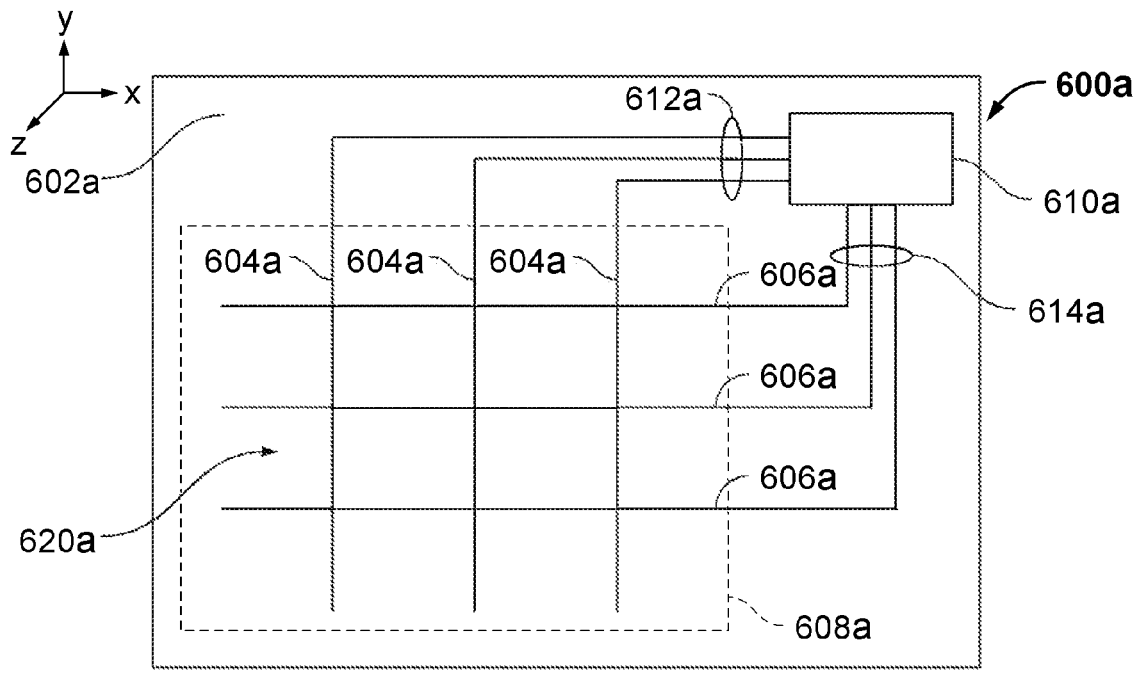
FIG. 6A shows a top-side view of an example sensing device having a plurality of conductive rows and columns for detecting a presence of a conductive object over the sensor array.

FIG. 6A shows a top side view of an example sensing device having a plurality of conductive rows and columns for detecting a presence of a conductive object over the sensor array. Though some of the conductive structures disclosed herein can be referred to as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the conductive structures may be evenly arranged in orthogonal rows and columns (an "array"), or arranged in non-linear configurations, for example, having certain positional offsets with respect to one another (e.g., a "mosaic"). Thus, the conductive structures referred to as rows and columns need not be arranged orthogonally to one another, or disposed in an even distribution, in any instance, but may include arrangements having asymmetric shapes and unevenly distributed elements.

The sensing device 600a can be configured to determine the location of a conductive object, for example, a user's finger or a stylus, relative to the sensing device 600a and to provide this location to an external circuit, for example, an addressing circuit, a computer, or other electronic device. In one embodiment, the sensing device 600a can be disposed over an underlying display (not shown). In such an embodiment, a viewer can observe at least a portion of the underlying display through a sensor region 608a of the sensing device 600a.

The sensing device 600a can include a substantially transparent cover substrate 602a having a set of conductive rows 606a and a set of conductive columns 604a disposed underneath the cover substrate 602a. Details of the set of conductive rows 606a and the set of conductive columns 604a are not shown in FIG. 6A for clarity. The cover substrate 602a can include an insulating material, for example, glass. The conductive rows and columns 606a, 604a define a sensor array 620a within a sensor region 608a. The conductive rows and columns 606a, 604a are electrically coupled to a sensing circuit 610a by conductive leads 612a, 614a.

In some embodiments, the sensing circuit 610a periodically applies a pulse signal to the individual conductive rows and columns 606a, 604a and detects the capacitance between separate conductive rows and columns 606a, 604a and/or between a conductive row or column and an arbitrary earth ground. The sensing circuit 610a can include hardware and/or programmable logic. The capacitance between a conductive row and a conductive column can be referred to as "mutual capacitance" and the capacitance between a conductive row or column and an arbitrary earth ground can be referred to as "self capacitance." Positioning a conductive object relatively close to an overlap between conductive rows and columns 606a, 604a changes the local electrostatic field which reduces the mutual capacitance between conductive rows and columns 606a, 604a. The sensing circuit 610a can detect the presence of a conductive object that is located proximally (e.g., touching or disposed near) to an area of the sensor region 608a by periodically detecting the mutual and/or self capacitances of the conductive rows and columns 606a, 604a and comparing the changes in capacitance from a default condition. Based on the patterning of the geometry of the conductive rows and columns 606a, 604a, the location of the conductive object relative to the sensing device 600a can be determined. Accordingly, other factors that may change the local electrostatic field near one or more rows and columns 606a, 604a, for example, electrical interference produced by another circuit, for example, a wireless power transmitter 104 generating a wireless power field, can affect the sensing performance of the sensing circuit 610a.

Figure 6B:
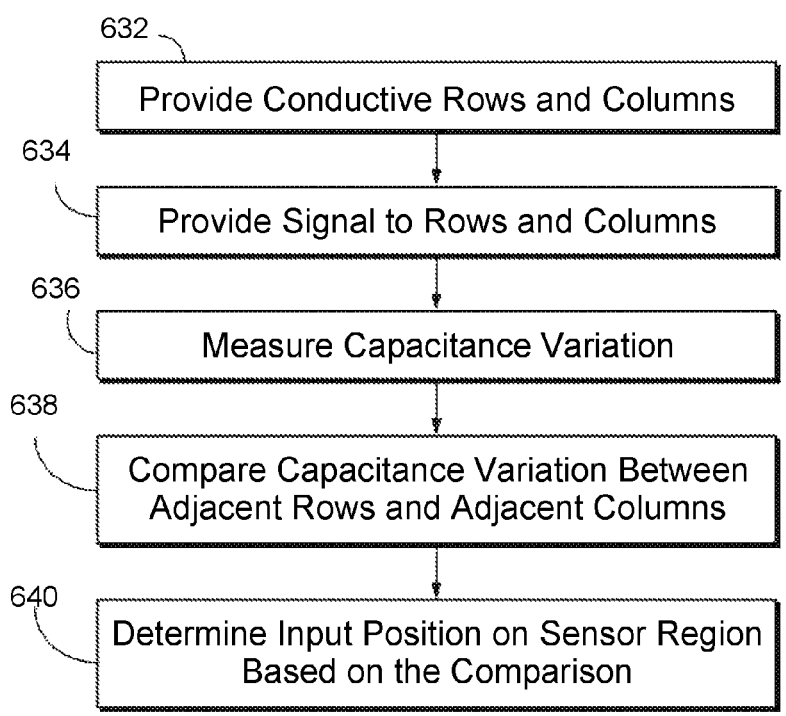
FIG. 6B shows a flow diagram illustrating an example method of operating a sensing device.

FIG. 6B shows a flow diagram illustrating an example method of operating a sensing device. The method 630 can be used to operate various sensing devices, for example, the sensing device 600a of FIG. 6A. As shown at block 632, conductive rows and columns spaced apart from each other can be provided to form a sensor array within a sensor region. As discussed above, the sensor region can be disposed over an underlying display. As shown at block 634, a signal can be provided to each conductive row and column by an external sensing circuit and the capacitance variation of each row and column can measured over time as shown at block 636. The sensing circuit can compare the temporal capacitance variation between adjacent rows and adjacent columns as shown at block 638. Each row can be associated with a coordinate position (e.g., a vertical position) on the sensor region and each column can be associated with another coordinate position (e.g., a horizontal position) on the sensor region such that the compared capacitance variation is used to determine a two-dimensional input position (e.g., a horizontal-vertical coordinate position) of a conductive object over the sensor region as shown at block 640.

According to some embodiments, the sensing circuit 600a attached to the conductive rows and columns 606a, 604a may be configured to perform a measurement during initialization of the display device. If the initialization measurement reveals that the capacitance of the sensing components are above a threshold value, the sensing circuit 600a may be configured to signal the presence of a noise due to external sources. Based on a comparison of the measurement with different thresholds, the sensing circuit 600a, according to some embodiments, may be configured to identify the external source as a wireless power field. The threshold values may be pre-programmed or calibrated during production of the device, and may be stored in a look-up table in a memory of the display device. The sensing characteristic relied upon by the sensing circuit 600a may be modified to account for the presence of noise due to the wireless power field. For example, one or more of the: sensitivity threshold, drive strength of the sensing waveform, frequency of a driving signal, and the type and amount of filtering (e.g., post-processing) applied to the received sensing signal may be adjusted.

Figure 7A:
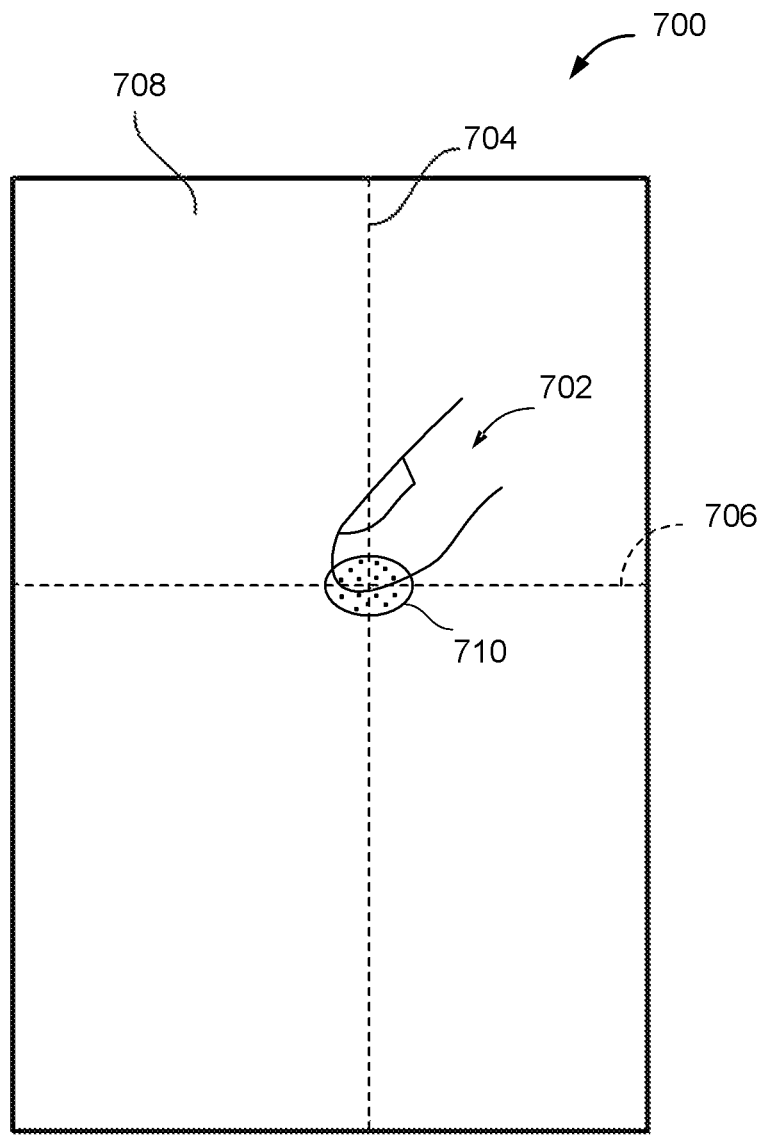
FIGS. 7A and 7B show an example of a touch sensing device including a user interface.
Figure 7B:
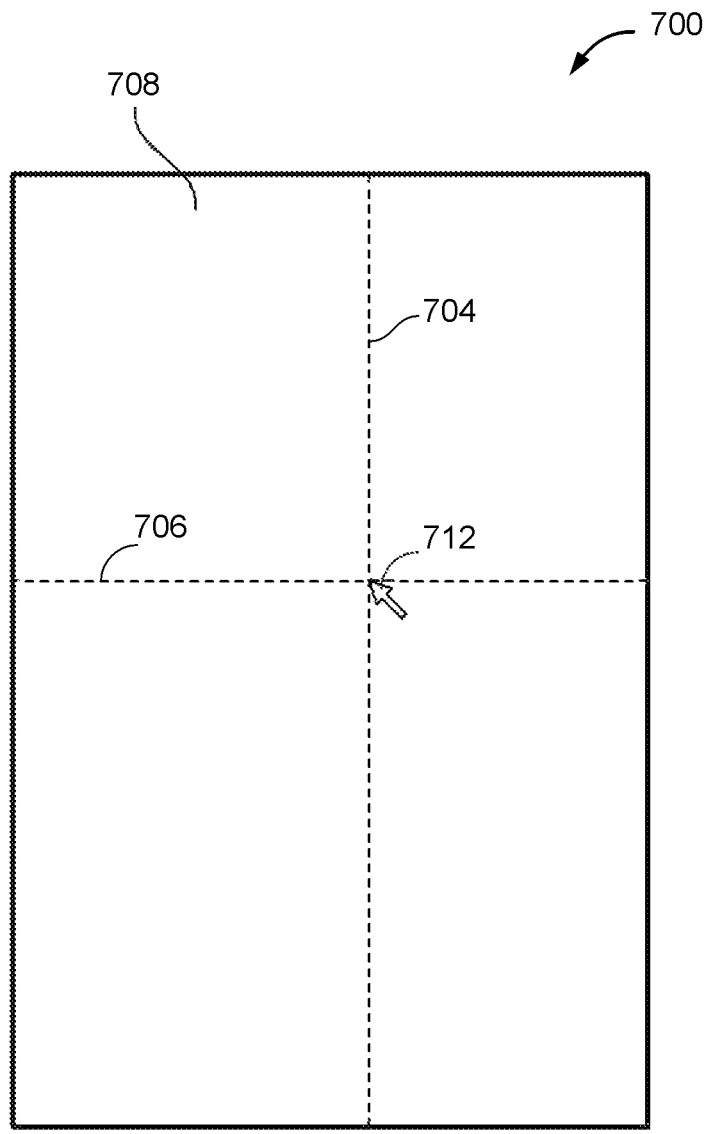

FIGS. 7A-7B show an example of a touch sensing display device including examples of a user interface according to some embodiments. The touch sensing device 700 can include a sensor region 708 that can be disposed at least partially over a display device. As shown in FIG. 7A, the touch sensing display device 700 can be configured to sense an area 710 of a touch input by a conductive object, for example, a finger 702. A sensing device included in the touch sensing display device 700 can include one or more conductive rows 706 and one or more conductive columns 704. For clarity, FIGS. 7A and 7B illustrate a singular conductive row 706 and a singular conductive column 704.

As discussed above with reference to FIG. 6A, a sensing circuit can periodically apply a pulse signal to the individual conductive rows and columns 706, 704 to detect the capacitance between separate conductive rows and columns 706, 704 and/or between a conductive row or column and an arbitrary earth ground. Positioning the finger 702 near an overlap between a conductive row 706 and a conductive column 704 can change the local electrostatic field which reduces the mutual capacitance between conductive row and column 706, 704. The sensing circuit can detect the presence of the finger 702 that is located proximally (e.g., touching or disposed near) to an area 710 of the sensor region 1108 by periodically detecting the mutual and/or self capacitances of the conductive rows and columns 706, 704 and comparing the changes in capacitance from a default condition (e.g., a detection threshold value). In some embodiments of touch sensing display devices, a touch input may be used to interact with embedded software. For example, touch input may be used to manipulate a cursor element to navigate through software and/or to display handwritten text and/or to enter handwritten text into a memory.

Turning now to FIG. 7B, the touch sensing display device 700 is schematically illustrated with a cursor element 712 displayed underneath the area 710 of touch input of FIG. 7A. A user may manipulate the cursor element 712 by varying the location of touch input. For example, a user may touch the sensor region 708 with finger 702 such that the cursor element 712 is displayed underneath the area of touch 710 and may subsequently move the finger 702 to a second area of the sensor region 708 such that the cursor element 712 is displayed underneath the second area.

Figure 8A:
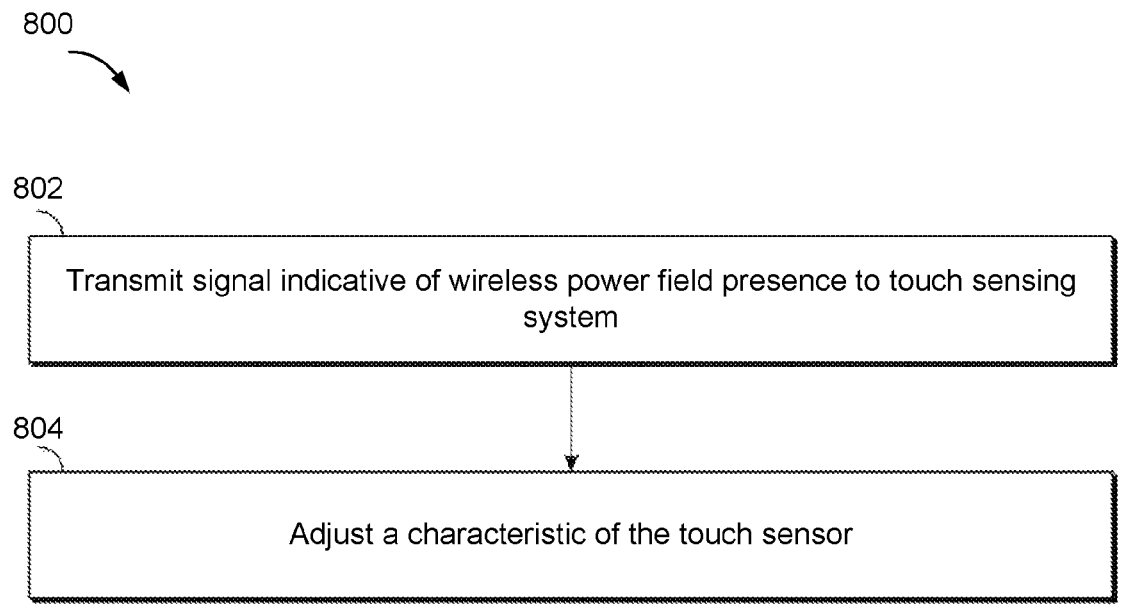
FIGS. 8A-8B show flow charts of example processes for use with a touch sensing device according to some embodiments.
Figure 8B:
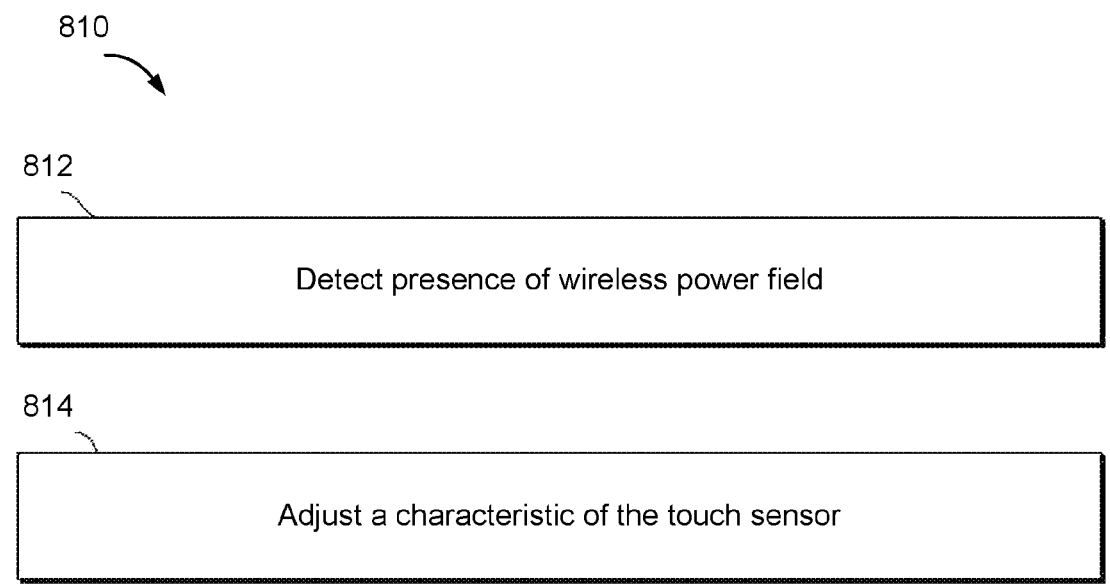

FIGS. 8A-8B show flow charts of example processes for use with a touch sensing display device according to some embodiments. As illustrated in FIG. 8A, the method 800 may include transmission of a signal indicative of the presence of a wireless power field as illustrated by block 802. In response to the receipt of the signal, the method 800 may include adjusting a characteristic of the touch sensor as illustrated by block 804. As illustrated in FIG. 8B, the method 810 may include detection of the presence of wireless power field as illustrated by block 812. In response to the detection, the method 810 may include adjusting a characteristic of the touch sensor as illustrated by block 814. In some embodiments, a sensing characteristic can include signal-to-noise ratio, sensitivity threshold, voltage level of the input waveform to the touch sensor 354, drive strength of the sensing waveform, frequency of a driving signal, and the type and amount of filtering (e.g., post-processing) applied to the received sensing signal. In one example, the wireless power field may result in an increase in electrical interference and a touch sensing controller 352 may increase a sensing characteristic, for example, drive strength, based on the increased electrical interference. Accordingly, the performance of the sensing device can be adjusted along with the change in electrical interference that is due to the wireless power field. In another example, the frequency of the wireless power field may correspond to a frequency within range of the driving frequency for driving the touch sensor 354. In such an example, if the frequency of the wireless power field, or one of its harmonics, is close to the sensing frequency, the electrical interference characteristic may increase. To limit and/or lower the electrical interference characteristic, either of the wireless power frequency or sensing characteristic may be adjusted. In some embodiments, the touch sensor 354 can be configured to reduce or eliminate false touches and minimize loss of sensitivity as will be described in greater detail with reference to FIG. 12.

Figure 9:
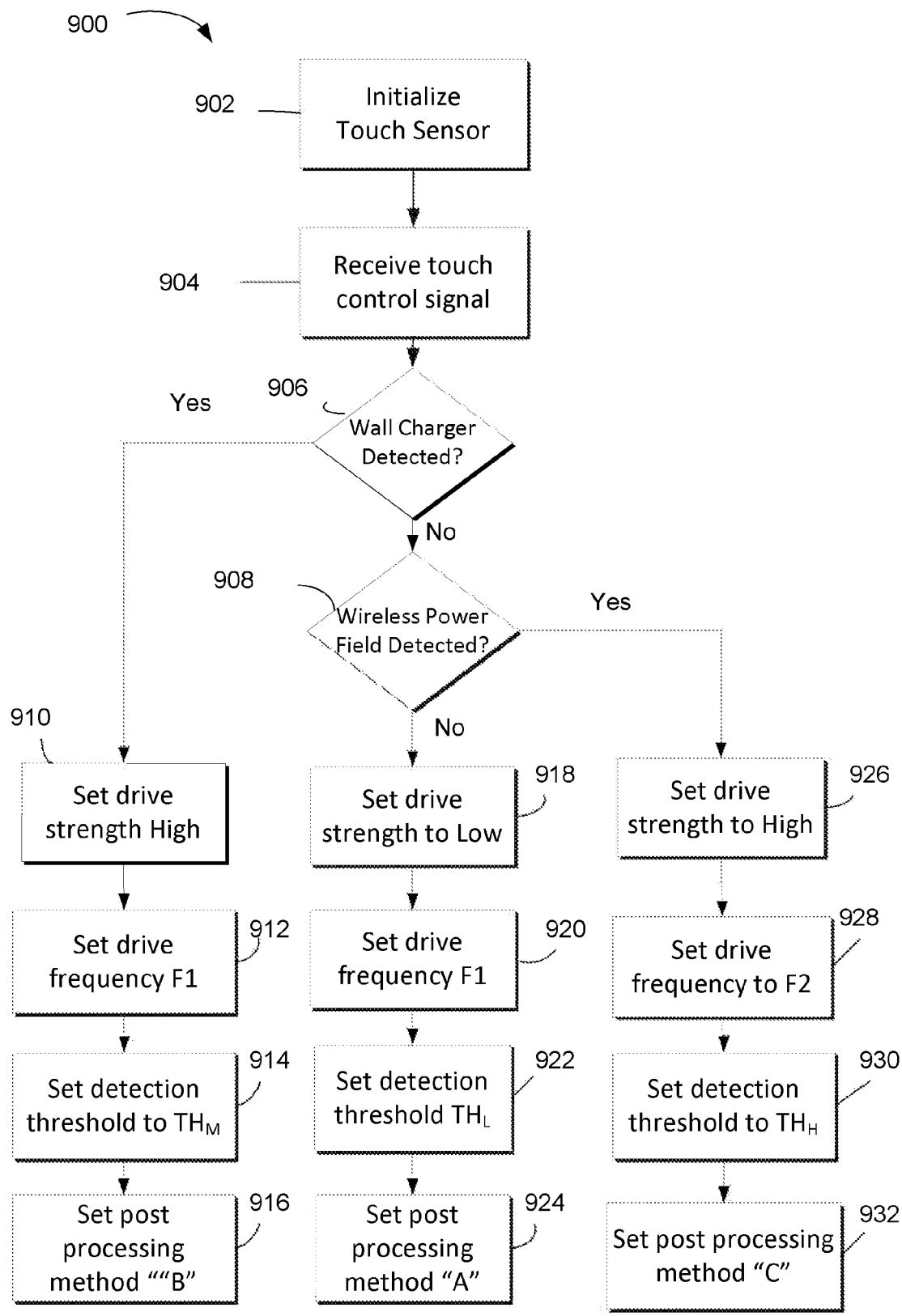
FIG. 9 shows a flow chart of an example of a process for use with a touch sensing device according to some embodiments.

FIG. 9 shows a flowchart of an example of a process for use with a touch sensing device according to some embodiments. The method 900 may be implemented in a controller, such as a touch sensing controller 352 included in a device, such as a charging device 350. As discussed above with reference to FIG. 5B, the touch sensing controller 352 may be configured to initialize and adjust characteristics of touch sensor 354. As illustrated in FIG. 9, the method 900 may begin by initializing a touch sensor 354 as illustrated by block 902. A touch control signal (e.g., touch control signal 320) may be received as illustrated by block 904. The method 900 may then determine whether a wall charger is detected as illustrated by decision block 906. If a wall charger has been detected, the drive strength of a driving signal for the touch sensor 354 may be set to a relatively "high" level as illustrated by block 910. The "high" level for the drive strength may be relatively high when compared to the drive strength set in a state when a wall charger is not detected and a wireless power field is not present as will be discussed below. The drive frequency may be set to a first frequency F1 as illustrated by block 912. The detection threshold may be set to medium level (e.g., $TH_M$ such that $TH_M<TH_H$) as illustrated by block 914, and the post processing method may be set to post-processing method "B" as illustrated by block 916. The "high" drive strength may be used in the situation that a wall charger is detected since the presence of available power is not limited. The drive frequency F1, detection threshold $TH_M$, and post processing method "B" may correspond to settings that enable accurate detection of a touch input based on the drive strength. Further, in some embodiments, the drive frequency F1, detection threshold $TH_M$, post processing method "B", and "high" drive strength may be adjusted to levels that enable accurate detection of a touch both in the presence of a wireless power field and in the absence of a wireless power field.

Returning to decision block 906, if a wall charger is not detected, the method proceeds by determining whether a wireless power field is detected at decision block 608. If a wireless power field is not detected, the method proceeds to set the drive strength to "low" (e.g., lower than the drive strength used when a wireless power field is present or a wall charger is detected), the drive frequency to F1, the detection threshold to $TH_L$ (e.g., $TH_L<TH_M<TH_H$), and the post-processing method to "A" as illustrated by blocks 918, 920, 922, and 924 respectively. In the absence of both a wall charging unit and a wireless power field, a device may be configured to operate based on available battery power. As a result, reducing the amount of power that is used by a touch sensor may be beneficial. As illustrated in FIG. 9, the method operates in this mode by reducing the drive strength and the detection threshold in order to reduce the amount of power used by the touch sensor. The drive frequency F1 and post processing method "A" may correspond to settings which enable accurate detection of touch based on the corresponding low drive strength and low detection threshold.

Returning to decision block 608, if the method determines that a wireless power field is detected, the characteristics of the touch sensor are adjusted based on the presence of the wireless power field. As illustrated in FIG. 9, the drive strength is set to a "high" level, the drive frequency is set to frequency F2, the detection threshold is set to high level ($TH_H$), and the post processing method is set to "C," as illustrated by blocks 926, 928, 930, and 932 respectively. The drive frequency F2 and post processing method "B" may correspond to settings which enable accurate detection of touch in the presence of interference by a wireless power field. The "high" drive strength may be used in the situation that a wireless power field is detected since the presence of available power is not limited. Further, the detection threshold may be set to a higher level than that during operation in the presence of a wall charger since the wireless power field may interfere with the detection of a touch by the touch sensor. In the different operating modes, an example of the selection of the drive frequency F1 and F2 and the application of the post-processing method will be described in greater detail below with reference to FIGS. 10 and 11A-11C below.

The characteristics of the touch sensor 354 may be adjusted based on a look-up table which includes various characteristics corresponding to the environment of the touch sensor 354. The look-up table can include various interference characteristics (e.g., electrical interference characteristics) that can be affected by a wireless power field and provided to a touch sensor 354. In some embodiments, various levels of interference can be indicated in the look-up table. Each of these interference characteristics can affect the performance of a touch sensor 354 to different degrees by altering the local electrostatic field near one or more sensing elements. The look-up table can also include one or more characteristics to be adjusted based on the interference characteristic.

The look-up table can be programmed to include pre-set inputs and outputs and/or can be programmable by a user input to change the inputs and outputs. The look-up table can be stored in one or more storage devices coupled to a device including the touch sensor 354.

Figure 10:
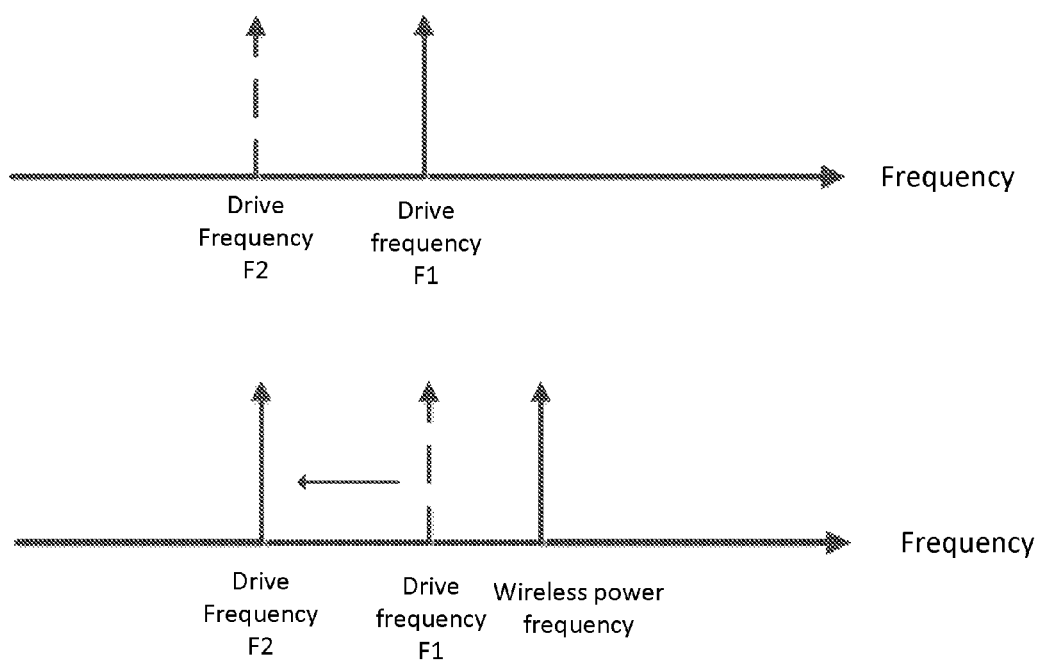
FIG. 10 shows an example of wireless power frequency adjustment according to some embodiments.
Figure 11:
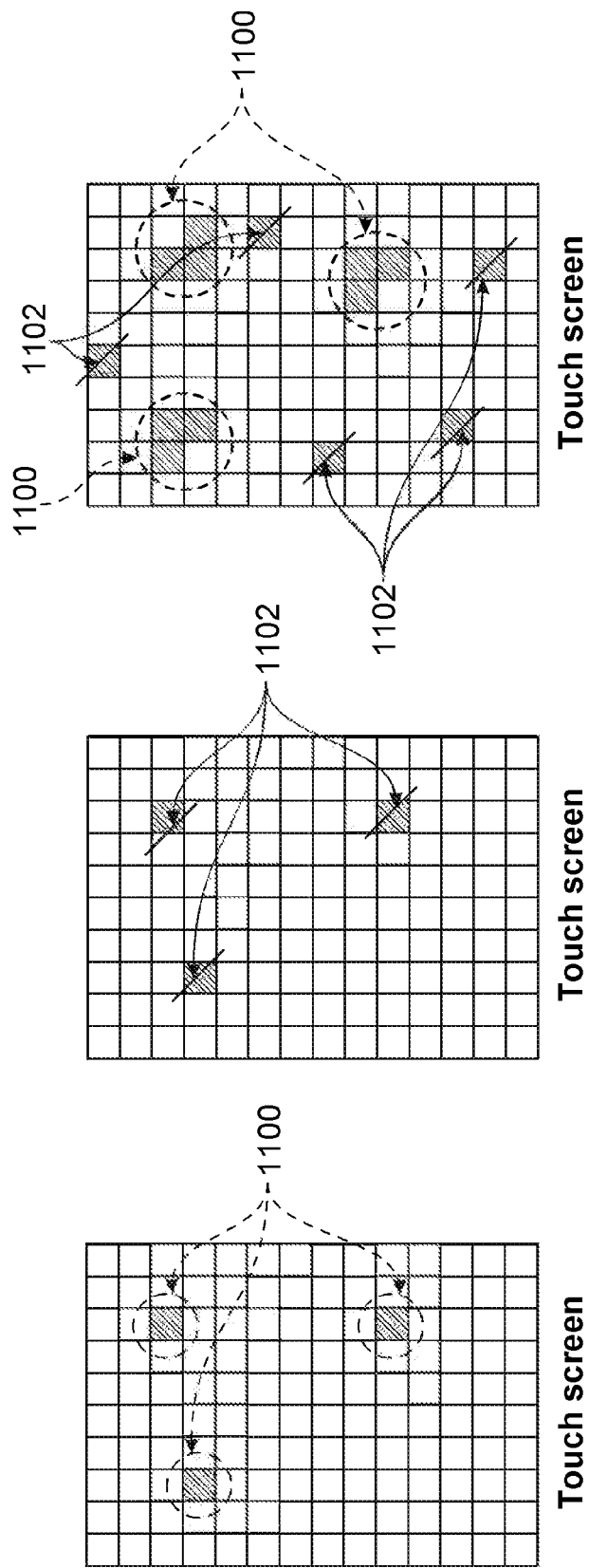
FIGS. 11A-11C show an example of post-processing adjustment according to some embodiments.

FIG. 10 shows an example of wireless power frequency adjustment according to some embodiments. As illustrated in FIG. 10, in the absence of a wireless power field, the drive frequency F1 for a touch sensor may be selected. Further, in the presence of a wireless power field having a wireless power frequency within range of the drive frequency F1, the drive frequency F2 may be selected. For example, F1 may be in the range of about 2-6 MHz. If wireless power field is configured to transfer power at a frequency of about 6.78 MHz, then F2 maybe selected to be about 200-400 khz.

FIGS. 11A-11C show an example of a post-processing adjustment according to some embodiments. As illustrated in FIG. 11A, in the absence of wireless power field, touch sense positions 1100 may be detected based on a signal received from an individual sensing element of the touch screen. Alternatively, in the presence of a wireless power field, a signal received from individual sensing elements may be filtered and determined to correspond to the interference caused by the wireless power field as illustrated by false sense positions 1102 in FIG. 11B. A post-processing or filtering method (e.g., post-processing method "C" of FIG. 9) may require a signal from multiple adjacent sensing elements for determining a touch sense position. For example, as illustrated in FIG. 11C, a post-processing method may recognize touch sense positions 1100 when a sensing signal is received from three adjacent sensing elements of the touch screen. Other detection techniques are also possible (e.g., detection of two or more adjacent sensing elements, and/or detection of the amount of time that a signal generated by the sensing element is present). Further, the post-processing method may ignore sensing signals received from individual sensing elements as illustrated by false detection positions 1102 in FIG. 11C.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments of the invention.

Figure 12:
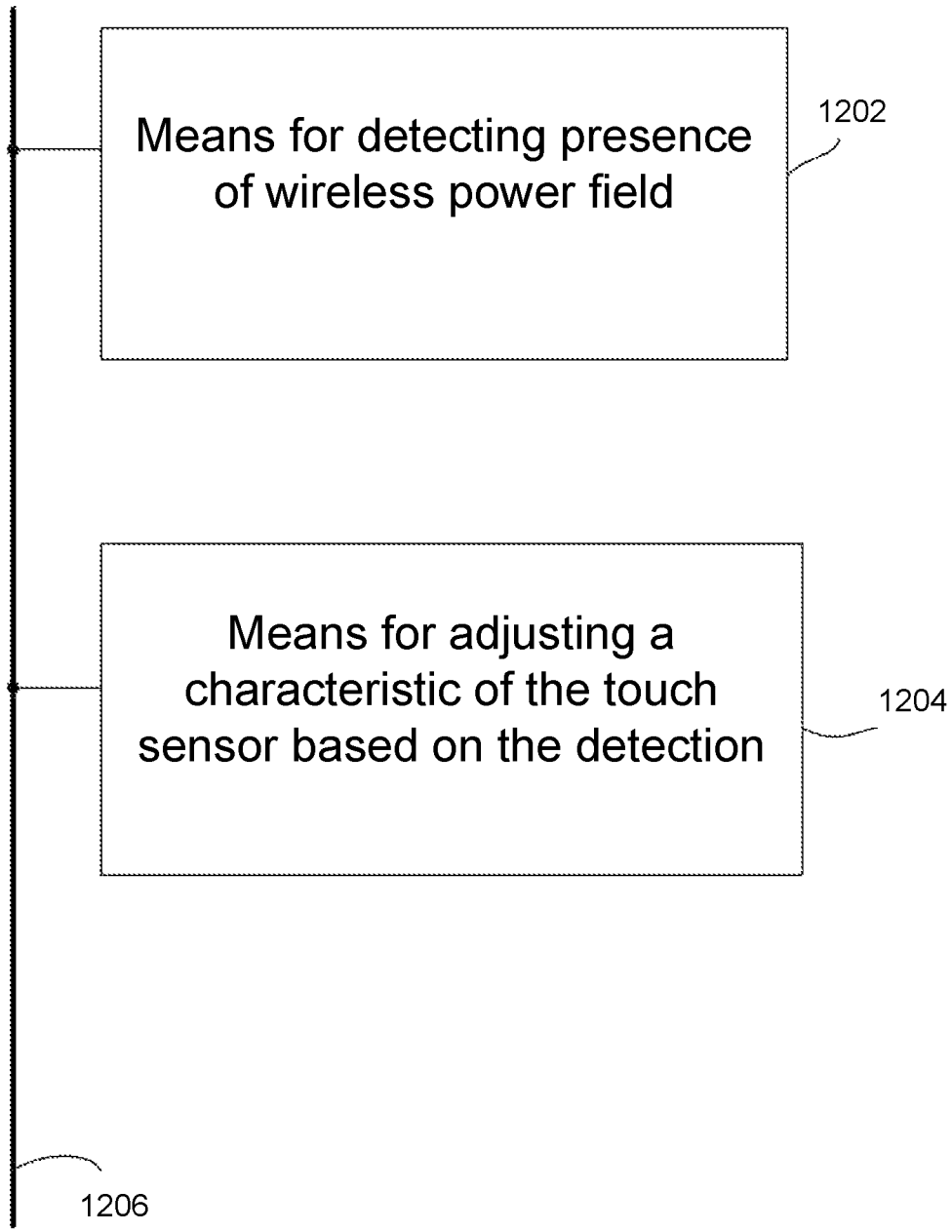
FIG. 12 illustrates a simplified block diagram of a device for operating a touch sensor according to some embodiments.

The functionality described herein (e.g., with regard to one or more of the accompanying figures) may correspond in some aspects to similarly designated "means for" functionality in the appended claims. FIG. 12 illustrates a simplified block diagram of a device for operating a touch sensor according to some embodiments. As illustrated in FIG. 12, means for detecting the presence of a wireless power field 1202 may correspond to a detector included in a charging device 350, or a touch sensing controller 352 as discussed above with reference to FIGS. 5A-5B. Further, the means for detecting the presence of a wireless power field 1202 may correspond to a wireless power receiver 108. Means for adjusting a characteristic of a touch sensor based on the detection 1204 may correspond to a touch sensing controller 352 as discussed above with reference to FIG. 5B. The means for detecting presence of the wireless power field 1202 and the means for adjusting a characteristic of the touch sensor based on the detection 1204 may communicate via a means for communication 1206 (e.g., a communication bus).

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A device comprising:
   a touch sensor;
   a detector configured to detect a presence of a wireless power field for charging or supplying power to the device; and
   a controller configured to adjust at least one characteristic of the touch sensor based at least in part on the detected presence of the wireless power field.

2. The device of claim 1, wherein the touch sensor is configured to sense a touch based on the detected presence of the wireless power field.

3. The device of claim 1, wherein the controller is configured to increase the at least one characteristic of the touch sensor.

4. The device of claim 1, wherein the at least one characteristic of the touch sensor includes a signal-to-noise ratio.

5. The device of claim 1, wherein the at least one characteristic of the touch sensor includes a sensitivity threshold of the touch sensor.

6. The device of claim 1, wherein the at least one characteristic of the touch sensor includes a driving frequency of the touch sensor.

7. The device of claim 6, wherein the controller is further configured to receive information including a frequency of the wireless power field, and wherein the controller is configured to adjust the driving frequency of the touch sensor based on the frequency of the wireless power field.

8. The device of claim 1, wherein the at least one characteristic of the touch sensor includes a post-processing method.

9. The device of claim 1, wherein the touch sensor includes a plurality of sensing elements, and wherein the detector is configured to detect the presence of the wireless power field based on a change in at least one of the plurality of sensing elements.

10. The device of claim 1, further comprising a sensing circuit and a lookup table, the lookup table being stored in one or more storage devices coupled to the sensing circuit, wherein the at least one characteristic comprises at least one addressing characteristic and at least one sensing characteristic, wherein the lookup table includes the at least one addressing characteristic and the at least one sensing characteristic.

11. A method of operating a touch sensor, the method comprising:
    detecting a presence of a wireless power field for charging or supplying power to a device that includes the touch sensor; and
    adjusting at least one sensing characteristic of the touch sensor based on the detection.

12. The method of claim 11, wherein the adjusting comprises increasing a drive strength of a driving waveform.

13. The method of claim 11, wherein the adjusting comprises increasing a detection threshold.

14. The method of claim 11, wherein the adjusting includes adjusting a driving frequency of the touch sensor.

15. The method of claim 14, further comprising determining a frequency of the wireless power field; and adjusting the driving frequency of the touch sensor based on the frequency of the wireless power field.

16. The method of claim 11, wherein the at least one sensing characteristic includes a post-processing method.

17. The method of claim 11, wherein the touch sensor includes a plurality of sensing elements, and wherein detecting the presence of the wireless power field includes detecting based on a change in at least one of the plurality of sensing elements.

18. The method of claim 11, wherein the adjusting includes correlating information regarding the wireless power field with a sensing characteristic based on information stored in a lookup table.

19. A device for operating a touch sensor, the device comprising:
    means for detecting a presence of a wireless power field for charging or supplying power to the device; and
    means for adjusting at least one sensing characteristic of the touch sensor based on the detection.

20. The device of claim 19, wherein the detecting means comprises a detecting circuit, and wherein the adjusting means comprises a controller.

21. The device of claim 19, wherein the adjusting means includes means for increasing a drive strength of a driving waveform.

22. The device of claim 19, wherein the adjusting means includes means for increasing a detection threshold.

23. The device of claim 19, wherein the means for adjusting a sensing characteristic includes means for adjusting a driving frequency of the touch sensor.

24. The device of claim 23, further comprising means for determining a frequency of the wireless power field; and means for adjusting the driving frequency of the touch sensor based on the frequency of the wireless power field.

25. The device of claim 19, wherein the at least one sensing characteristic includes a post-processing method.

26. The device of claim 19, wherein the touch sensor includes a plurality of sensing elements, and wherein the means for detecting the presence of the wireless power field includes means for detecting based on a change in at least one of the sensing elements.

27. The device of claim 19, wherein the adjusting means includes means for correlating information regarding the wireless power field with a sensing characteristic based on information stored in a lookup table.

28. A computer program product for processing data for a program configured to operate a touch sensor, the computer program product comprising:
    a non-transitory computer-readable medium having stored thereon code for causing processing circuitry to:
    detect a presence of a wireless power field for charging or supplying power to a device; and
    adjust at least one sensing characteristic of the touch sensor based on the detected presence of the wireless power field.

29. The computer program product of claim 28 further comprising code for causing the processing circuitry to:
    determine a frequency of the wireless power field; and
    adjust a driving frequency of the touch sensor based on the determined frequency of the wireless power field.

* * * * *